March 23, 1948.  R. E. TOBEY  2,438,466
ICE CUBE FREEZING APPARATUS
Filed Nov. 8, 1943  2 Sheets-Sheet 1
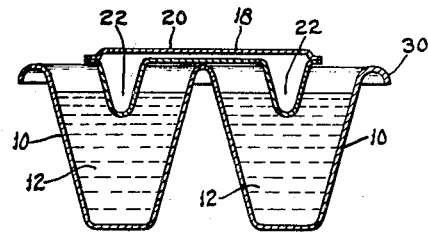
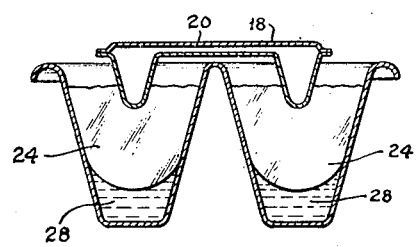
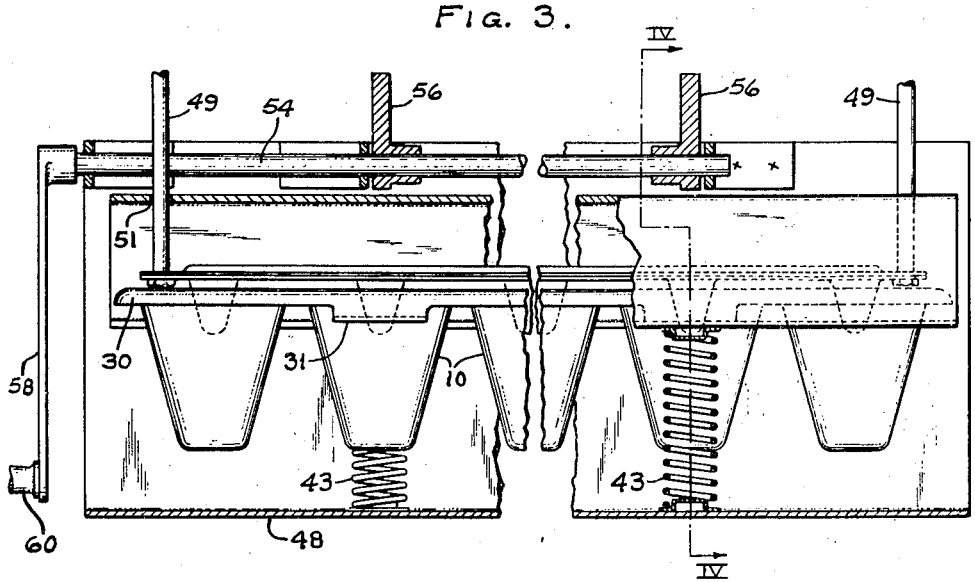
WITNESSES:
INVENTOR
RAYMOND E. TOBEY.
BY
ATTORNEY March 23, 1948.  R. E. TOBEY  2,438,466
ICE CUBE FREEZING APPARATUS
Filed Nov. 8, 1943  2 Sheets-Sheet 2

WITNESSES:

INVENTOR
RAYMOND E. TOBEY.
BY
ATTORNEY

Patented Mar. 23, 1948

2,438,466

UNITED STATES PATENT OFFICE 2,438,466

ICE CUBE FREEZING APPARATUS

Raymond E. Tobey, Springfield, Mass., assignor to Westinghouse Electric Corporation, East Pittsburgh, Pa., a corporation of Pennsylvania Application November 8, 1943, Serial No. 509,371

7 Claims. (Cl. 62—106)

My invention relates to refrigeration apparatus and more particularly to ice cube making apparatus.

One object of my invention is to produce improved appartus of the type set forth.

A further object of my invention is to facilitate the removal or harvesting of ice cubes from such apparatus.

A still further object of my invention is to produce ice cube making apparatus from which the ice cubes can be conveniently removed without the application of any heat to any part of the apparatus.

A still further object of my invention is to produce ice cube making apparatus in which the expansion of water, upon freezing, is utilized partly to disengage the ice cubes from the walls to which they normally adhere and which apparatus includes improved, easily operated means for completely disengaging said cubes from said walls.

These and other objects are affected by my invention as will be apparent from the following description and claims taken in connection with the accompanying drawings, forming a part of this application, in which:

Fig. 1 is a view in vertical cross-section of one form of evaporator and mold embodying my invention, the same being shown detached, and before the freezing process has begun;

Fig. 2 is a view similar to Fig. 1, showing the freezing process well advanced but not completed;

Fig. 3 is a view, partly in side elevation and partly in section, of ice cube making apparatus embodying my invention;

Figure 4:
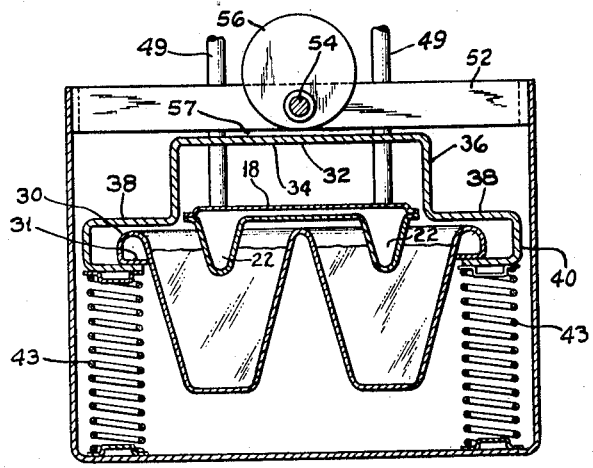
Fig. 4 is a sectional view on line IV—IV of Fig. 3, showing the position the parts assume when the water in the mold is completely frozen into cubes, but before any attempt is made to harvest the cubes.

In the preferred form thereof shown in the drawings, my apparatus includes one or more molds or sets of molds 10 adapted to receive water or other liquid 12 to be frozen. The molds 10 may be of any desired size and shape, except as hereinafter pointed out. Coacting with the molds 10 is an evaporator or refrigerating element 18 comrising a body portion 20 and a number of pendant, cup-shaped extensions 22 corresponding to the number of molds used. Liquid refrigerant is circulated through the evaporator 18 in any well-known manner which need not be shown or described.

In order to insure that the freezing of the water will begin at the top of each mold and progress downwardly to the bottom thereof, the sides and bottom of the mold are not directly refrigerated. Also, the depth of the mold 10 should be equal to, or slightly greater than the width of the top thereof, and the portion of the pendant refrigerating member 22 which is immersed in the liquid 12 should be not in excess of 40 per cent, and preferably between 30 per cent and 40 per cent, of the depth of the mold.

As shown in Fig. 2, the water in the molds 10 is partly frozen, to form masses or partly formed cubes 24 which extend downwardly to within a short distance from the bottom of the molds. The cubes 24 naturally adhere to the sides of the molds 10 and the remaining water 28 is thus confined in the space between the bottoms of the cubes and the bottoms of the molds. When the remaining water 28 freezes, the vertical component of the force resulting from expansion of the water is exerted against the cubes 24 and the bottoms of the molds 10. This force moves the molds 10 downwardly relative to the upper portion of the cubes, thus breaking the bond between the upper portions of the cubes 24 and the corresponding portions of the wall of the molds. The cubes 24 now adhere to the evaporator extension 22 and the lower portions of the molds. The molds 10 are yieldably supported, as, for example, by the apparatus hereinafter described, to permit the downward movement of said molds effected by the freezing. With the cubes 24 adhering only to the lower portions of the molds, the molds can relatively easily be disengaged, thus leaving the cubes attached to the freezing element 22. The cubes 24 can now be easily removed from the extensions 22.

Figs. 2 to 6

In order to separate the frozen cubes from the evaporator extensions 22 as well as from the lower portions of the molds 10, and in order to accomplish this without the necessity of handling either the cubes or the molds, I have devised an apparatus, one form of which is illustrated in Figs. 3 to 6 of the drawings.

As shown, the molds 10 are arranged in adjacent rows which may be integral and each of which may have any desired number of molds. The molds are provided with side rims 30, which, at intervals, are provided with inwardly-deflected, horizontally-disposed extensions 31. Positioned above the rows of molds is a yoke 32 which includes a horizontal portion 34 and vertical side walls 36. The vertical side walls 36 terminate in oppositely and horizontally-disposed U-shaped members each of which comprises an upper wall 38, a vertical wall 40 and a lower wall 42. The lower walls 42 constitute tracks for the horizontal portions 31 of the rims 30 of the molds 10. The yoke 32 is biased upwardly by springs 43, which engage guides 44 on the underside of the tracks 42 and guides 46 carried by a bottom support 48. The evaporator 18 may be rigidly mounted in position by any desired means, but in the preferred embodiment illustrated the evaporator is carried by rods 49 which are secured to the interior of a suitable enclosure such as a refrigerator cabinet or the like.

The bottom support 48 forms part of a housing or frame which includes vertical side walls or frame members 50, and a top wall or frame member 52. In the member 52 is journaled a shaft 54 which carries one or more cams 56, according to the length of the yoke 32 and the rows of the molds 10. The shaft 54 is rotated by a crank 58 having a handle 60 to bring the cams into and out of engagement with the yoke 32, to move the yoke and the molds 10 downwardly. If desired, the rods 49 supporting the evaporator 18 pass through openings 51 in the horizontal portion 34 of the yoke 32, thus forming guides on which the yoke 32 slides. This prevents the springs 43 from shifting.

*Figs. 2 to 6—Operation*

Figure 6:
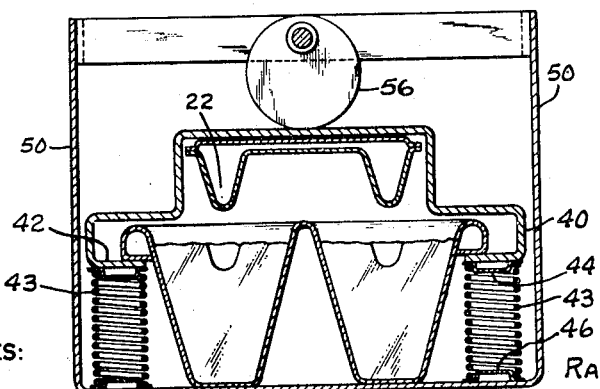

In using ice cube making apparatus embodying my invention, the cams 56 are rotated to bring the parts to the position shown in Fig. 6 in which the upper rims of the molds 10 clear the bottom of the refrigerating elements 22, to permit withdrawal of the molds 10. The molds are filled with water to the proper level, making allowance for the expansion which will occur upon freezing. The molds are then replaced, with horizontal portions 31 of the rims 30 thereof resting upon the tracks 42. The cams 56 are now rotated in the reverse direction, and the yoke 32 and the molds 10 now resume their uppermost position, in which the refrigerating elements 22 are immersed in the water 12 to the desired extent, and in which the yoke 32 abuts against the cams 56 or the frame member 52 or both.

As the refrigerant circulates through the evaporator 18, the uppermost portion of the water 12 is subjected to freezing temperature and begins to congeal well in advance of the middle and lower portions of the water in the molds 10. Due to the fact that the walls of the molds are not directly refrigerated, the water near the bottom of the molds is the last to freeze.

The frozen cubes 24 adhere to the corresponding portions of the molds and to the evaporator extension 22, thus confining the water 28 between the bottoms of the molds and the bottom of the cubes 24. The vertical component of the force resulting from the expansion when the water 28 freezes, depresses the molds 10, thus breaking the bond between the upper portions of the cubes 24 and the corresponding portions of the molds. The downward movement of the molds 10 correspondingly depresses the yoke 32 so that it is now slightly spaced from the cam 56 and frame member 52, as shown at 57 in Fig. 4. The completely frozen mass now adheres to the bottom portion of the mold and to the surface of the evaporator extensions 22.

Figure 5:
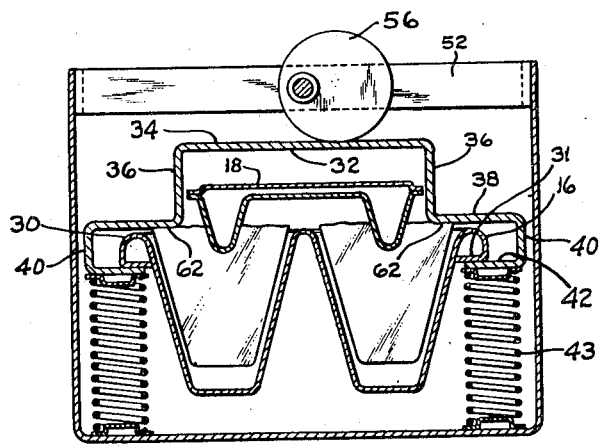
Fig. 5 is a view similar to Fig. 4, illustrating one step in harvesting the ice cubes; and, Fig. 6 is a view similar to Fig. 5, showing the final step in harvesting the ice cubes.

When it is desired to remove or harvest the cubes 24, the cams 56 are rotated from the position shown in Fig. 4 to the position shown in Fig. 5. In so rotating, the cams 56 depress the yoke 32 to bring the horizontal portions 38 thereof to bear downwardly against the upper portions of the rims 30 of the molds 10. The molds are thus completely stripped from the cubes 24. Further rotation of the cams 56 brings the horizontal portions 38 of the yoke 32 to bear downwardly against the upper edges of the cubes 24, as at 62, in Fig. 5. As the cams are further rotated, the cubes 24 are stripped from the pendant evaporator extensions 22 and drop into the molds 10. The extensions 22 are preferably provided with a highly polished exterior surface in order to minimize the adhesion of the cubes 24 thereto, which, in turn, will minimize the effort needed to strip the cubes from the refrigerating elements.

Further rotation of the cams 56 depresses the yoke 32 and hence the molds 10, until the upper rims 30 of the molds 10 clear the bottoms of the evaporator extension 22 as shown in Fig. 6. The molds 10 may now be withdrawn and the loose cubes therein removed. In order to retain the parts in this position while the molds 10 are withdrawn, emptied, refilled with water and replaced, the cams 56 are turned to the dead-center position illustrated in Fig. 6.

It will thus be seen that I have produced an ice cube making apparatus in which the freezing of the lowermost portion of the water is delayed until the upper portion thereof has been frozen hard and has adhered to the upper portion of the walls of the mold and to the evaporator 22, so that the force of expansion, which results when the lowermost portion of the water freezes, is used to break the bond between the upper portion of the frozen mass and the corresponding wall of the mold. This is accomplished by immersing the refrigerating element to a definite, limited extent, into the upper portion of the water to be frozen, while the side and bottom of the mold are left unrefrigerated, and by proportioning the vertical and transverse dimensions of the mold with respect to each other and to the dimensions of the freezing element.

It will also be seen that I have produced a simple, compact and easily operable mechanism for completing the separation of the frozen cubes from the molds in which they are frozen, as well as from the refrigerating element to which the cubes adhere, and that this is accomplished without the necessity of handling the cubes or the molds.

While I have shown my invention in but one form, it will be obvious to those skilled in the art that it is not so limited, but is susceptible of various changes and modifications without departing from the spirit thereof, and I desire, therefore, that only such limitations shall be placed thereupon as are specifically set forth in the appended claims.

What I claim is:

1. In liquid freezing apparatus, the combination of an open top mold having a storage space therein for the liquid to be frozen, the interior side wall surfaces of said mold diverging upwardly, a cooling unit extending downwardly through the open top of said mold into the upper portion of said liquid storage space to absorb heat directly from the upper portion of said liquid to freeze said portion, the lowest portion of said liquid being in poorer heat transfer relationship with said cooling unit than any portion of said liquid above said lowest portion.

2. In liquid freezing apparatus, the combination of a cooling unit, an open top mold having a storage space therein for the liquid to be frozen, the interior side wall surfaces of said mold diverging upwardly, means for resiliently positioning said mold with respect to said cooling unit so that the cooling unit extends into and freezes the upper portion of the liquid in said mold, the lowest portion of said liquid being in such poor heat transfer relationship with said cooling unit that said lowest portion is the last portion of said liquid to freeze after said mold and said liquid are so positioned, means engaging said mold to force the same downwardly from said frozen liquid and for thereafter forcing said frozen liquid downwardly from said cooling unit.

3. In liquid freezing apparatus, the combination of a cooling unit, an open top mold having a storage space therein for the liquid to be frozen, the interior side wall surfaces of said mold diverging upwardly, means for resiliently positioning said mold with respect to said cooling unit so that the cooling unit extends into and freezes the upper portion of the liquid in said mold, the lowest portion of said liquid being in such poor heat transfer relationship with said cooling unit that said lowest portion is the last portion of said liquid to freeze after said mold and said liquid are so positioned, means engaging said mold to force the same downwardly from said frozen liquid and retain said mold therebelow and for thereafter forcing said frozen liquid downwardly from said cooling unit, whereupon said frozen liquid drops back into said mold.

4. An ice cube making apparatus comprising an open top mold having downwardly converging side walls and adapted to contain the water to be frozen, an evaporator having a hollow pendant portion adapted to contain a refrigerant liquid, said portion extending downwardly into said mold a distance not in excess of 40 per cent of the depth of said mold, and a duct communicating with the hollow of said pendant portion for conducting a refrigerant liquid thereto.

5. The structure recited in claim 4 in which the depth of said mold is substantially equal to the width of said mold measured near the top thereof.

6. The structure recited in claim 4 in which the lowest portion of said water is in poorer heat-transfer relation with the evaporator than any of the portions of said water above said lowest portion.

7. An ice cube making apparatus comprising an open top, tray-like mold adapted to contain the water to be frozen, and an evaporator having a hollow pendant portion containing a refrigerant and extending downwardly through the open top of said mold into the upper portion of said water, said pendant portion being spaced from the walls of said mold, the depth to which said evaporator pendant portion extends downwardly being not in excess of 40 per cent of the depth of said mold, whereby the upper portion of said water freezes into a mass which adheres to said pendant portion and to the upper portion of said mold, in advance of the freezing of the lower portion thereof, said mold being mounted for yielding movement with respect to said evaporator portion in response to the force exerted by expansion occurring upon the freezing of the lower portion of said water, whereby the upper portion of said mold is stripped from the upper portion of said mass.

RAYMOND E. TOBEY.

REFERENCES CITED

The following references are of record in the file of this patent:

UNITED STATES PATENTS

| Number | Name | Date |
|---|---|---|
| 1,510,147 | Keith | Sept. 30, 1924 |
| 1,758,567 | Fernandez | May 13, 1930 |
| 1,976,147 | Smith | Oct. 9, 1934 |
| 2,037,417 | Hull | Apr. 14, 1936 |
| 2,063,208 | Tweedale | Dec. 8, 1936 |
| 2,114,642 | West | Apr. 19, 1938 |
| 2,302,044 | Mochel | Nov. 17, 1942 |